US012691465B2

(12) United States Patent
Mendez-Gallon

(10) Patent No.: US 12,691,465 B2
(45) Date of Patent: Jul. 28, 2026

(54) APPLICATION NOZZLE, APPLICATION UNIT AND METHOD

(71) Applicant: VOITH PATENT GMBH, Heidenheim (DE)

(72) Inventor: Benjamin Mendez-Gallon, Königsbronn (DE)

(73) Assignee: Voith Patent GmbH, Heidenheim (DE)

( * ) Notice: Subject to any disclaimer, the term of this patent is extended or adjusted under 35 U.S.C. 154(b) by 36 days.

(21) Appl. No.: 18/826,298

(22) Filed: Sep. 6, 2024

(65) Prior Publication Data

US 2024/0424519 A1 Dec. 26, 2024

Related U.S. Application Data

(63) Continuation of application No. PCT/EP2023/052111, filed on Jan. 30, 2023.

(30) Foreign Application Priority Data

Mar. 9, 2022 (DE) ..................... 10 2022 105 510.8

(51) Int. Cl.

| | |
|---|---|
| ***B05C 5/00*** | (2006.01) |
| ***B05B 1/00*** | (2006.01) |
| ***B05B 1/04*** | (2006.01) |
| ***B05C 5/02*** | (2006.01) |

(52) U.S. Cl.

CPC .............. *B05C 5/005* (2013.01); *B05B 1/005* (2013.01); *B05B 1/04* (2013.01); *B05C 5/02* (2013.01)

(58) Field of Classification Search

None

See application file for complete search history.

(56) References Cited

U.S. PATENT DOCUMENTS

| | | | | |
|---|---|---|---|---|
| 4,486,470 A * | 12/1984 | Stuck | ........................ | C23C 4/08 427/427 |
| 6,203,858 B1 | 3/2001 | Plomer | | |
| 6,309,704 B1 | 10/2001 | Hess et al. | | |
| 8,418,645 B2 | 4/2013 | Henninger et al. | | |
| 10,130,965 B2 | 11/2018 | Adamsson | | |

(Continued)

FOREIGN PATENT DOCUMENTS

| | | |
|---|---|---|
| DE | 102004029565 A1 | 1/2006 |
| DE | 102015204975 A1 | 9/2016 |

(Continued)

*Primary Examiner* — Alexander M Weddle

(74) *Attorney, Agent, or Firm* — Laurence A. Greenberg; Werner H. Stemer; Ralph E. Locher

(57) ABSTRACT

An application nozzle, an application unit, and a method are used for applying a liquid or pasty coating medium onto a running surface, in particular onto a running surface in a machine for producing or processing a fibrous web. The application nozzle contains a fluid head which is configured to produce a film from a coating medium or a curtain from a coating medium, and the application also additionally contains a blowing head which is configured to generate a linear jet of gaseous medium. An impact line is additionally provided on which the linear jet of gaseous medium impacts the film or curtain made of the coating medium, thereby forming a spray curtain. The blowing head is arranged such that the spray curtain is oriented in the direction of the running surface.

17 Claims, 4 Drawing Sheets

(56) References Cited

U.S. PATENT DOCUMENTS

| | | | |
|---|---|---|---|
| 11,434,607 | B2 | 9/2022 | Mendez-Gallon et al. |
| 11,767,638 | B2 | 9/2023 | Henninger et al. |
| 2006/0086827 | A1 | 4/2006 | Sekiya |

FOREIGN PATENT DOCUMENTS

| | | | |
|---|---|---|---|
| DE | 202015009603 | U1 | 8/2018 |
| DE | 102017124280 | A1 | 4/2019 |
| EP | 0928845 | A2 | 7/1999 |
| EP | 3332955 | B1 | 4/2019 |
| EP | 3830336 | A1 | 6/2021 |
| WO | 9508026 | A1 | 3/1995 |

* cited by examiner

APPLICATION NOZZLE, APPLICATION UNIT AND METHOD

CROSS-REFERENCE TO RELATED APPLICATION

This application is a continuation, under 35 U.S.C. § 120, of copending International Patent Application PCT/EP2023/052111, filed Jan. 30, 2023, which designated the United States; this application also claims the priority, under 35 U.S.C. § 119, of German Patent Application DE 10 2022 105 510.8, filed Mar. 9, 2022; the prior applications are herewith incorporated by reference in their entirety.

FIELD AND BACKGROUND OF THE INVENTION

The invention relates to an application nozzle for the application of a liquid or pasty coating medium onto a running surface, in particular onto a running surface in a machine for producing or processing a fibrous web, as well as a corresponding application unit or application method.

A plurality of coating methods are known for the application of coating media on paper or board webs. So-called film presses are often used in particular as application units for starch. In this case, a film composed of the coating medium is applied onto a transfer roll, and subsequently transferred in a transfer nip to the fibrous web.

Excess coating medium is often discharged onto the transfer roll, and then metered to the desired application quantity by means of suitable scraper metering systems. Such scraper metering systems are described, for example, in the published, non-prosecuted German patent application DE 10 2004 029 565 A1, corresponding to U.S. Pat. No. 8,418,645.

In the context of the further development of the film press, the use of application rolls with very hard roll covers (0 to 5 P&J, or above 60 SHD) is introduced in the operation of the film press with higher nip loads (80 to 180 KN/m). The high pressure and the short time the substrate spends in the nip as a result of the very small contact zone between the rolls in the roll nip leads to improved penetration and distribution of the starch into the structure of the fibrous web so that a higher efficiency of the starch (higher strengths with identical application quantity) can be achieved.

The use of the very hard roll covers leads in the case of the scraper metering devices to increased wear of the metering elements used since these metering elements are in direct contact with the rotating roll surface. The hard roll covers likewise undergo wear or can acquire markings e.g. of the profile of the scraper bars.

The possibility of the small variation of the application quantity of the volumetric metering element when changing the contact pressure on the metering element can also no longer be used since the surface of the application roll cannot be deformed as a result of the greater hardness. Easy correction of the application quantity of the volumetric metering elements is thus no longer possible.

In particular for use with hard rolls, contact-free metering systems were therefore developed in the past, in the case of which excess coating medium is no longer applied, rather is already metered prior to application.

One possible embodiment of such application units lies in applying the coating medium in the form of a free-falling curtain onto the transfer roll. This is described, for example, in the published European patent application EP 3830336 A1. One challenge in the case of these application units is to maintain the stability of the very thin, free-falling curtain even under the challenging conditions of a production plant.

Alternatively, application units are known, for example, from European patent EP 3332955 B1 (corresponding to U.S. Pat. No. 10,130,965), in the case of which the coating medium is sprayed via a row of spray nozzles onto the application rolls. Contacting metering elements can also be dispensed with here. It is, however, disadvantageous in such application units that the spray nozzles used can easily become contaminated or blocked during operation. For this reason, the spray nozzles of EP 3332955 B1 are embodied to be individually removable for frequent cleaning. Alternatively, it is proposed in German utility model DE 20 2015 009 603 U1 to provide a double set of nozzles, of which in each case half are in operation, and the rest are in the maintenance position.

The distribution of the coating medium over the width of the application roll or the material web to be coated furthermore requires a large number of individual spray nozzles. In order to achieve a uniform coating, the spray cones are also embodied in a still largely overlapping manner, as a result of which the number of spray nozzles is further increased. This not only increases investment costs, but also increases maintenance outlay, since uniform coating is no longer ensured even in the case of individual defective or blocked nozzles.

A secondary mist composed of coating material which is not transferred to the application roll and which remains in the spray chamber furthermore arises during the application of spray. The entire spray chamber with its installations would be contaminated in a short period of time by this secondary mist. In order to prevent this, as represented in European patent EP 3332955 B1, the spray chamber must be provided with an extraction system. Approximately 5% of the coating medium are thus normally discharged via the extraction system and returned to be used again.

SUMMARY OF THE INVENTION

One object of the present invention is to propose an alternative application nozzle as well as the associated application unit and method which overcomes in particular the difficulties of the prior art.

A further object of the present invention is to propose a contact-free application system which has a low tendency to contamination.

A yet further object of the invention is to propose an application system which ensures a stable application of the coating medium onto the transfer roll in particular in comparison with curtain application.

The object is achieved according to the invention by embodiments according to the independent claims. Further advantageous embodiments of the present invention are found in the subordinate claims.

In terms of the application nozzle, the object is achieved by an application nozzle for the application of a liquid or pasty coating medium onto a running surface, in particular onto a running surface in a machine for producing or processing a fibrous web.

According to the invention, it is provided that the application nozzle contains a fluid head which is formed to generate a film or a curtain composed of coating medium and the output nozzle furthermore contains a blow head which is formed to generate a linear jet of gaseous medium. An impact line is furthermore provided at which the linear jet composed of gaseous medium impacts on the film or curtain composed of coating medium, thereby forming a spray curtain. The blow head is arranged so that the spray curtain is directed in the direction of the running surface.

The running surface can be in particular the surface of a rotating roll or the surface of the fibrous web.

The present invention achieves in a very creative manner the advantages of curtain application, namely the uniform, machine-wide application of the coating medium, but avoids the disadvantages of the sensitive curtain.

Moreover, a spray application can also be used for large machine widths of 10 m and more with the proposed application nozzle without the number of spray nozzles and thus the risk of contamination being massively increased.

The term linear jet composed of gaseous medium should be understood in the context of this application as a jet composed of gaseous medium, in particular an air jet which has a certain thickness and a certain extent (in the width direction of the running surface), this extent being multiple times larger (e.g. 10 times, 100 times or more) than the thickness. Such a linear jet can be generated, for example, by means of a slot nozzle, in the case of which the length of the slot is multiple times larger than the thickness.

The film or curtain composed of coating medium and/or the linear jet composed of gaseous medium can advantageously extend over at least 50%, preferably more than 80%, in particular the entire width of the running surface.

The idea of the invention lies in generating a film or curtain composed of coating medium in the desired width by means of a fluid head. This film/curtain can be guided freely or supported in the direction of the blow head under the influence of gravity. This fluid head can advantageously be embodied in the manner of the known curtain nozzles as a 'slot die' or 'slide die'.

At the impact line, the film/curtain is acted upon by a jet of gaseous medium, generally air. A spray curtain is generated by these media which impact on one another. If the speed of the gaseous medium is selected to be significantly higher than the speed of the film/curtain, the direction of the generated spray curtain will correspond substantially to the direction of the jet of gaseous medium. It can thus be achieved by suitable establishment of the blow head that the spray curtain is directed in the direction of the running surface-therefore e.g. in the direction of the surface of a rotating roll.

The spray curtain generated in such a manner does not have the form of a thin, free-falling curtain. On the contrary, seen from the side, the spray curtain will have the form of a spray cone and have a certain opening angle δ. If "the direction of the spray curtain" is discussed in this context, the central direction of this spray cone should thus always be meant.

The term "impact point" of the spray curtain is then supposed to refer to the point on the running surface at which the center of the spray wedge contacts the running surface.

The terms "running surface" and "moved surface" are used synonymously in the context of this application. In the majority of applications, such a running surface can be the surface of a rotating roll or the surface of the fibrous web.

The coating medium can advantageously be a starch solution.

In the simplest case, the gaseous medium can involve air.

A very significant advantage of the present invention is the fact that a plurality of individual spray nozzles which can become blocked with the coating medium do not have to be used to generate the spray curtain. For example, the coating medium can be discharged, for example, from the low-maintenance wide slot nozzles which are tried-and-tested in the case of curtain application.

A uniform coating can furthermore be achieved without the overlapping of the spray cones of adjacent spray nozzles otherwise required in the case of spray application.

The blow head for the generation of the jet of gaseous medium can also have a very simple structure. In the simplest case, the blow head can be composed of a wide slot nozzle which extends over the entire desired width and which can be connected e.g. to a simple air blower or a compressed air supply.

If desired, the blow head can also be embodied in a more complex manner and comprise e.g. a row of individual air nozzles arranged next to one another.

Since the blow head barely comes into direct contact with the coating medium, and the medium is conveyed away from the blow head by the air jet, the risk of contamination is very low.

As a result of the combination of fluid head and blow head, the present application nozzle is in principle a two-substance nozzle. As a result of this, the application nozzle has yet another highly advantageous property. The metering of the quantity of coating medium can be adjusted depending on the speed of the air jet. The speed of the spray curtain is reached by changing the quantity of air which the air fan conveys through the blow head. The application quantity and spray speed can thus be adjusted independently of one another.

This leads to the possibility, in contrast to curtain application, of applying even small quantities of coating medium in a stable manner.

In advantageous embodiments, it can be provided that the application nozzle contains a support surface which is arranged so that the coating medium is discharged from the fluid head onto the support surface, and is guided as a fluid film along the support surface.

It can furthermore be provided that the lower end of the support surface forms a breaking edge, and the impact line is provided at this breaking edge or at a distance of less than 5 mm from this breaking edge.

This breaking edge can be provided with a structure, in particular with an undulating structure or a saw tooth structure.

As a result of the principle of the supported film, the adhesion force of the liquid on a flat or curved support surface is used to avoid the shrinkage of the liquid film premetered on this support surface. As a result of this, the adhesion force of the material used (preferably stainless steel, or rust-free metals) for the support surface (blade, nozzle wall or the like) is higher than the shrinkage force of the surface tension, the coating medium adheres to the support surface with minimal shrinkage and flows downward through the action of gravity, in particular if this support surface is arranged perpendicularly or at an angle of inclination of up to 45 degrees.

One particularly great advantage of the principle of the supported film is that the throughflow quantity or the application quantity of the film applied on this supported wall can be reduced to even 2.5 l/min/m or increased to more than 100 l/min/m without disruptions in the film such as holes, the formation of filaments or so-called film bursts arising on this support surface. An evenly premetered film for the subsequent spraying process can thus be offered at the breaking edge of the support surface.

The premetered film leaves the support surface at the lower edge of the support surface. At this moment, the supporting, shrinkage-avoiding effect of the wall is lost and the surface tension begins to act again, hence the formation of filaments, bursts and shrinkage can arise in the film. The smaller the film thickness or the throughflow quantity of the liquid film premetered on this support surface, the more pronounced this effect is.

In order to avoid or minimize this effect of the surface tension at the lower edge of the support face, a further feature may be advantageous in order to avoid an otherwise necessary use of tensides or other surface tension-active auxiliary agents.

Liquid filaments or droplets occasionally (usually in the case of the reduction in the film throughflow quantity to below 8 l/min/m) form on the lower edge of the support surface of the liquid film, which liquid filaments or droplets significantly impair the uniformity of the provided film in the transverse direction of the machine (CD direction).

If this provided film is converted by the linear jet of gaseous medium into a spray curtain, holes, discontinuities or irregularities arise in the CD profile of the application quantity of the generated spray curtain as a result of the surface-tension effects described above.

In order to avoid this problem, it can be provided that, instead of a straight breaking edge of the supported liquid film, a structured, e.g. undulating or saw tooth-shaped breaking edge is used at the lower edge of the support surface, as a result of which the effective length of the breaking edge is elongated.

As a result of an undulating or saw tooth-shaped or otherwise suitably structured geometry, the wetting angle of the coating medium with respect to the breaking edge can be used optimally so that the surface tension of the coating medium itself ensures improved wetting, optimal contact and homogeneous distribution of the liquid over this edge.

As a result of this mechanical solution (saw tooth edge or finely undulating edge), in many cases, an otherwise necessary chemical solution with the use of expensive tensides can be avoided or circumvented.

In particularly preferred embodiments, it can be provided that the support surface is provided entirely or partially by the wall by the wall of the blow head.

This is also advantageous because the distance from the fluid head to the blow head, and thus the section on which the film or curtain of coating medium runs, cannot be made to be of an arbitrarily large size. In practice, this distance is often less than 50 cm, in particular less than 30 cm. In this case, the installation of a separate component as a support surface is often difficult.

This problem can very easily be avoided in that the wall of the blow head, or a part thereof, is embodied in such a manner that it is suitable as a support surface for a film of application medium. In particular, this part of the wall of the blow head can be manufactured from metal, e.g. stainless steel and furthermore be embodied to be smooth, i.e. without screws, fittings or further structural elements (such as e.g. engraved numbers or texts).

It is generally advantageous if the support surface is smooth and no deposits of coating medium occur on this support surface. The support surface can therefore be treated to increase smoothness and/or reduce the tendency toward adhesion. Some examples of suitable treatments are listed below:

- Teflon coating, i.e. coating with plastics containing fluorine such as PTFE (polytetrafluoroethylene) to avoid or minimize adhesion (adherence);
- Plastic coating e.g. with a polyethylene;
- Grinding; and
- Electropolishing or plasma polishing.

The treatments listed here are particularly advantageous if the support surface is composed entirely or partially of a metal, for example, of stainless steel.

In further preferred embodiments, it can be provided that the length of the spray curtain, and thus the distance between the impact line and the running surface along the direction of the spray curtain, is at most 80 mm, in particular less than 20 mm, particularly preferably leas than 10 mm.

In the case of the spray application known from the prior art, a distance between the nozzle and the surface, and thus a length of the spray curtain of approximately 100 mm, is used to ensure that the result of the superimposed spray images of the individual nozzles is sufficiently good and homogeneous.

Spray curtains with lengths of less than 50 mm can according to the prior art only be adjusted with difficulty, while lengths below 20 mm cannot be adjusted at all, since otherwise uncovered points, significant CD-profile irregularities and holes would arise in the spray image.

The application nozzle proposed here enables in a very simple manner the adjustment of very short lengths of the spray curtain of less than 50 mm. In tests, it was even possible to effectively operate spray curtains with a length of 3 mm.

The shorter the length of the spray curtain, the more uniform the application image and the CD-profile of the liquid film applied by means of this spray device on a rotating roll or on a web supported thereon.

Moreover, as a result of the use of shorter spray curtains, less or no spray mist arises. One of the problems of traditional spray application can thus be avoided or minimized in a very simple manner. Application nozzles or application units according to aspects of the present invention can therefore often be embodied without a separate extraction system for the secondary mist, which significantly reduces both the procurement costs and the operating costs.

As a result of the shorter length of the spray curtain, the spray curtain develops a higher dynamic pressure on the impact line or on the impact surface on the moved surface, which is advantageous in terms of the braking and limiting of the negative effects of the air boundary layer.

As a result of the shorter length of the spray curtain, the flight-speed of the spray droplets is reduced to a significantly smaller extent than in the case of a longer flight distance. The droplet speed of the spray curtain reduces approximately with the square of the flight length of the spray curtain. Thus, in the case of a shorter length of the spray curtain, a significantly greater dynamic pressure of the spray curtain can be generated on the surface so that the air boundary layer can be controlled or avoided in an improved and more efficient manner.

In order to avoid or at least massively reduce the secondary mist, there are still further advantageous possibilities available in the context of the present invention which can be used in each case on their own or in combination.

It can thus be provided, for example, that the direction of the spray curtain has a component which is directed counter to the movement of direction of the running surface.

The spray curtain positioned counter to the direction of movement of the surface, for example, the roll surface avoids or minimized the generation of secondary mist since the transfer rate of the coating medium to the surface is improved as a result of this. A further advantage of this arrangement is the fact that the spray curtain itself reduces the air boundary layer of the moved surface. The spray curtain acts in this case as a contact-free, active air boundary layer restrictor (“aircut”).

It is furthermore also advantageous for the avoidance of secondary mist if the spray curtain meets the running surface at a flat impact angle α.

In this case, the angle which the direction of the spray curtain encloses with the tangent of the running surface at the impact point is referred to as the impact angle α. The impact angle α lies in the range between 0° and 90°.

A relatively flat impact angle α of at most 60°, in particular an impact angle α between 10° and 50° has been shown to be highly advantageous.

In advantageous embodiments, the blow head can be embodied to be movable, in particular rotatable, in such a manner that the direction of the spray curtain, and thus also the impact angle α can be easily adjusted.

Moreover, a movable embodiment of the blow head and/or of the fluid head can also be advantageous in order to move these from a working position into a maintenance position.

The feature of a spray application in the opposite direction to the direction of movement of the surface together with a central impact angle α which is as flat as possible in the range from 0 to at most 60 degrees facilitates the uniformity of the film composed of coating medium applied on the moved surface. The resultant reversal of direction of the spray curtain after contact with the substrate results in a film homogenization and improved film adhesion on the running surface.

The feature of a spray application in the opposite direction to the direction of movement of the moved surface at a central impact angle which is as flat as possible in the range from 0 to at most 60 degrees together with a small distance, or a short length of the spray curtain e.g. <10 mm is highly advantageous to reduce the influence of the air boundary layer which is transported by the running surface. The spray curtain blows counter to the direction of the air boundary layer. As a result of this, due to the generated dynamic pressure of the accelerated spray curtain, the air boundary layer is braked, deflected and its effect on the spray transfer rate is minimized.

A further parameter which has an influence on the formation of secondary mist is the opening angle δ of the spray curtain.

A small opening angle enables a more compact spray curtain which is easier to handle and which in particular can also be arranged more easily at a flat impact angle α to the running surface.

A small opening angle δ can be achieved, for example, by a suitable configuration of the nozzle of the blow head. It can thus in particular be provided that the blow head has a lip, preferably an adjustable lip, at the outlet.

The opening angle can also be influenced by the viscosity of the coating medium or by the air speed of the blow head. Low viscosity and higher air speeds lead to a smaller opening angle of the wedge of the spray curtain.

The following table shows by way of example several advantageous embodiments:

| Feature | Example 1 | Example 2 |
|---|---|---|
| Opening angle δ | 25° | 20° |
| Long spray curtain | 10 mm | 5 mm |
| Impact angle α | 50° | 30° |
| Direction spray curtain | Counter to direction of movement | Counter to direction of movement |

In preferred embodiments, the running surface can be provided by the surface of a rotating transfer roll.

Alternatively, the running surface can also be provided by a running fibrous web. This fibrous web can run either freely or supported, for example, by a roll during application of the coating medium.

It may be advantageous for an application on both sides if the application unit has two transfer rolls which jointly form a roll nip. It can then be provided that the application unit has two application nozzles according to one aspect of the invention, the first application nozzle applying the coating medium onto the first transfer roll, and the second application nozzle applying the coating medium onto the second transfer roll.

In this case, one or two transfer rolls with very hard roll coverings (0 to 5 P&J, or above 60 ShD) can be provided. During operation of the application unit, higher nip loads (80 to 180 kN/m) can be used.

One of the two transfer rolls can be embodied as a controlled deflection roll. This is very important precisely in the case of pairs of hard transfer rolls to ensure a uniform profile over the entire width of the application unit even if a plurality of different operating states should be realized.

One or more of the application nozzles are preferably arranged so that the spray curtain impacts on the surface of the roll between the 7 o'clock position and the 12 o'clock position, preferably between the 8 o'clock and the 12 o'clock position, in particular between the 8 o'clock position and the 10 o'clock position.

The position should be understood in each case with a view of a roll rotating in the clockwise direction.

By selecting the suitable position of the spray curtain, additional effects can be achieved when setting the suitable impact angle of the spray curtain in conjunction with the minimization of the influence of the air boundary layer and avoiding secondary mist. These effects are demonstrated in particular in the range between the 7 and 10 o'clock position, especially between the 8 and 10 o'clock position of the application zone. This zone is therefore preferred. The range between 10 o'clock and 12 o'clock is also a usable, but less optimal positioning range for the spray curtain. The range between 12 and 15 o'clock is sometimes also possible depending on the configuration of the application unit. This region is less preferred since the tendency to generate secondary mist is, however, significantly more pronounced there.

The position of the impact zone in the range between the 7:00 and 9:00 o'clock position, in particular between the 8:00 and 9:00 o'clock position at the transfer roll (or to a fibrous web supported on a rotating roll) has the advantage that any droplets which form on the lip of the nozzle can be discharged perpendicularly and outside the application surface through the action of gravity so that no droplet marks can be generated on the application film.

In terms of the method, the method is achieved by a method for applying a coating medium, in particular a starch solution, onto a running surface, in particular onto a running surface in a machine for producing or processing a fibrous web, the application is performed by means of an application unit according to one aspect of the invention.

The devices and methods proposed here are particularly well suited to generating and spraying fine to rough spray, produced from coating media on the basis of low-viscosity liquids or liquid mixtures.

Even if the present invention is particularly well suited to the application of starch solution, it is not restricted to any single coating medium.

Coating media may be, for example:

Pure water or water with polar or non-polar soluble additives (for example, salts, dyes).

Water mixed with other liquids (with binding agents, with thickener, with extensional rheology thickener, with alcohol, or any type of mixable or non-mixable components).

Aqueous starch solutions of all types of natural starch (maize, wheat, potatoes, tapioca, barley, rice, etc.). The gelatinization and degradation of the starch for the production of starch solutions can be performed by various methods: pure chemical gelatinization, thermo-chemical gelatinization, pure thermal gelatinization, enzymatic gelatinization and combinations of various methods.

Coating colors with finely dispersed, solid micro-particles, such as mineral coating pigments such as CaCO3, kaolins, talcum or other mineral pigments, etc. with a rough, medium or fine aspect ratio or synthetic or polymer pigments, or similar synthetic or polymer pigments.

Aqueous dispersions of fiber-based substances such as nano-fibrillated cellulose, micro-fibrillated cellulose, nano-cellulose, cellulose fibers with short or long fibers.

Any low-viscosity liquids with Brookfield viscosity <300 mPas, preferably <200 mPas, measured at 100 rpm, 60° C., spindle 4.

The optimum viscosity level of the coating medium lies below 200 mPas, in particular in the range between 0.1 and 160 mPas for the Brookfield viscosity (100 rpm/55° C., spindle 4).

The solids content of the coating medium, in particular when using starch solutions for a method described here, advantageously lies in the range from 1 to 35%.

The specific weight of the coating medium can lie in the range from 0.8 g/cm$^3$ to 1.3 g/cm$^3$.

A method according to one of the aspects of the invention can be carried out at a processing temperature for the coating medium from 50° C. to 90° C. Temperatures of up to 100° C. are also possible.

The surface tension of the coating medium, in particular of the starch solution, can be from 30 mN/m to 70 mN/m (50° C.). The range of usable surface tensions can be expanded among other things through the use of a structured breaking edge.

The application quantity of coating medium per surface up to 100 l/m/min, in particular between 2.5 l/m/min and 50 l/m/min can be realized with methods according to aspects of the present invention. The metering is performed via the application nozzle without the use of contacting metering elements, as a result of which a use of hard transfer rolls also becomes possible.

The linear jet of gaseous medium at the output of the blow head can have a speed of more than 5 m/s, in particular more than 10 m/s or more than 12 m/s. One advantage of the invention is that the speed of the jet of gaseous medium—and thus the speed of the spray curtain—is largely decoupled from the application quantity of coating medium.

The described discharge nozzles or application units have been shown to be very advantageous, among other things, because, as a result of this, the occurrence of secondary mist can be entirely or largely avoided. It can, however, arise that the still remaining secondary mist is nevertheless still significant enough to lead to contamination of the application nozzles over time.

In principle, it is also possible to provide the application nozzles or application units according to the invention with extraction devices, as are known from the prior art. On the grounds of cost, it is, however, advantageous if such an extraction device can be dispensed with.

In this regard, the inventors have developed a solution which is very advantageous not only in combination with application units according to aspects of the invention, but rather independently of this represents a further inventive idea.

There is proposed an application unit for the application of a liquid or pasty coating medium onto a running surface, in particular onto a running surface in a machine for producing or processing a fibrous web, wherein the application unit can advantageously be an application unit according to one aspect of the invention.

The application unit according to the further inventive idea comprises an application nozzle for generating a spray curtain.

The application unit furthermore has an application space which is formed and delimited by:

the running surface;

at least a part of the wall of the application nozzle;

the spray curtain; and the point of the narrowest gap between the running surface and the application nozzle.

If a secondary mist is generated inside the application space, the application medium can thus indeed in principle be deposited on the delimiting surfaces, but does not generate any permanent contamination.

If the medium is deposited on the running surface, this is not critical since the surface is in any event covered with coating medium—or in the case of a reverse direction of movement is immediately covered with coating medium by the spray curtain—and no disturbances occur in the deposited film as a result of the depositing of the secondary mist. The additional coating medium can be easily transported further with the moved surface.

A depositing on the spray curtain is likewise not critical since, as a result of the movement of the spray curtain, the coating medium of the secondary mist is carried along in the direction of the moved surface and is deposited thereon.

No depositing is possible at the open gap between the running surface and the application nozzle. An escape of the secondary mist through this gap can, as described below, be avoided by adapting the geometry and, where applicable, additional sealing measures.

In order to avoid a depositing on the remaining wall, it is provided according to the further inventive idea that a film of flowing coating medium is applied onto the delimitation which is provided by at least a part of the wall of the application nozzle. The wall is thus rinsed continuously with coating medium ("rinsing medium") during operation of the application unit. Secondary mist which is deposited on this wall is easily transported away with the rinsing medium. Since the secondary mist is composed of the same coating medium as the rinsing medium, the medium is maintained with varietal purity and can be used for coating.

In this manner, extraction of the secondary mist can either be entirely avoided or brought about by a very simple and energy-expedient device.

An application unit with an application unit according to one aspect of the further inventive idea can in principle be used for all spray application units known from the prior art.

The rinsing medium can be collected without great outlay and supplied to the spray nozzles.

As a result of the structure of the application nozzles according to aspects of the present invention, such an application space for such application nozzles can be realized particularly easily.

One advantageous embodiment is, for example, an application unit according to one aspect of the invention, wherein the application unit has an application space which is formed and delimited by:

the running surface, the wall of the blow head, the spray curtain, the point of the narrowest gap between the running surface and the blow head, and wherein the coating medium from the fluid head is applied onto the wall of the blow head in such a manner that the entire wall of the blow head inside the application space is covered with coating medium.

Since, in advantageous embodiments of the invention, the application medium is discharged from the fluid head onto a support surface, wherein this support surface is provided by the wall of the blow head, the rinsing of this delimitation of the application space can be realized in an entirely natural manner. The coating medium used as rinsing medium is then conveyed together with any secondary mist collected by the jet of gaseous medium as a spray curtain onto the running surface when the breaking edge is reached. A separate discharge of the rinsing medium is not necessary here.

The part of the wall of the blow head which serves as a support surface can also be treated to avoid adherence, for example, by:

Teflon coating, i.e. coating with plastics containing fluorine such as PTFE (polytetrafluoroethylene) to avoid or minimize adhesion (adherence), plastic coating e.g. with a polyethylene, grinding, and electropolishing or plasma polishing.

In order to avoid an escape of secondary mist at the end sides of the application unit, it can be provided that the application space is closed by in each case a sealing surface on both end sides.

In principle, deposits of secondary mist can occur on these sealing surfaces. However, this does not disturb ongoing operation and the sealing surfaces can be very easily cleaned by the operating personnel when the machine is brought to a standstill for a short period of time. Separate edge rinsing or a double-walled wall rinsed with cold water can by condensation of water vapor the external sealing surfaces clean of deposits, but such a device is generally not necessary.

The thickness of the layer of the rinsing medium on the wall of the application nozzle or the blow head can be, for example, between 5 μm and 1000 μm, in particular between 10 μm and 500 μm.

In order to avoid an escape of larger quantities of secondary mist through the gap between the running surface—generally a transfer roll—and the application nozzle, it is advantageous if the narrowest gap between the running surface and the application nozzle, for example, the blow head, is between 2 mm and 20 mm wide.

In the case of a greater width, on the contrary, secondary mist will escape from the application space. In the case of a smaller width, there is the risk that, e.g. in the event of slight vibrations of the assembly, the running surface comes into contact with the application nozzle. In the case of gap widths of more than 2 mm, large layer thicknesses of rinsing medium (500 μm-1 mm) can also still be reliably realized.

A nozzle for generating an air flow can also still be provided for further sealing off of the application space, wherein the air flow is directed or can be directed from outside the application space to the narrowest gap. The air flow of this nozzle can be adjusted so that the secondary mist remains in the application space.

Finally, it may also be advantageous if the application space is shaped so that so that the tangent of the transfer roll intersects with the wall of the blow head inside the application space at the point of impact of the spray curtain. Droplets of coating medium that spin off tangentially when the spray curtain strikes the transfer roll thus land on the nozzle wall and can be taken up on the nozzle wall by the flowing, liquid film of rinsing medium and be transported further. As a result of this, it is avoided in particular that these droplets are flung through the gap and leave the application space.

If the kinetic energy of the splashes or secondary spray were to be so high that a reflection occurs after the impact on this rinsed surface, these reflected droplets can be caught and transported further by the running surface of the rotating application roll.

An increase in the length of the spray curtain leads to a reduction in speeds at which the spray impacts on the running surface, as a result of which the reflection of secondary spray upon impact is minimized or avoided.

Other features which are considered as characteristic for the invention are set forth in the appended claims.

Although the invention is illustrated and described herein as embodied in an application nozzle, an application unit and a method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
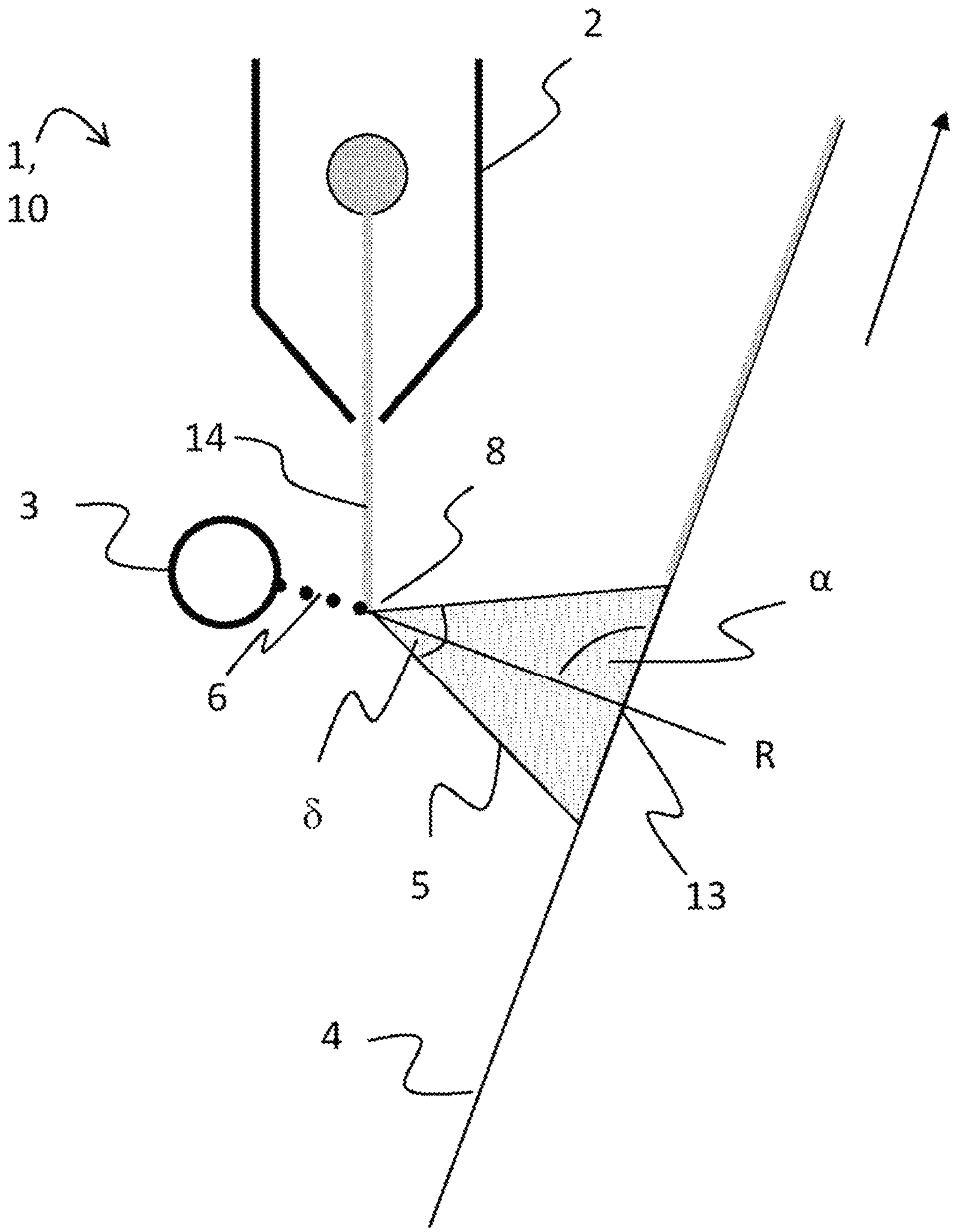
FIG. 1 is an illustration showing an application nozzle according to one aspect of the invention.

Referring now to the figures of the drawings in detail and first, particularly to FIG. 1 thereof, there is shown an application nozzle 1 as part of an application unit 10 for the application of a liquid or pasty coating medium onto a running surface 4 according to one aspect of the present invention.

In the embodiment shown here, the moved surface 4 is formed by a running fibrous web. In alternative embodiments, however, this can also be provided, for example, by the surface 4 of a transfer roller or the like.

In the case of the embodiment in FIG. 1, the application nozzle 1 contains a fluid head 2 which is embodied in the manner of a traditional broad slot nozzle and discharges a free-falling curtain of coating medium 14. The application nozzle furthermore contains a blow head 3 which is formed to generate a linear jet of gaseous medium 6, in general an air jet 6. Both the curtain 14 and the air jet 6 extend homogeneously in the transverse direction over the entire width to be coated of the surface 4.

While the curtain 14 falls downwards as a result of gravity, the air jet 6 is directed in the direction of the running surface 4. The air jet 6 meets the curtain 14 at an impact line 8. As a result of the speed of the air jet 6, the coating medium of the curtain 14 is converted here into a spray curtain 5. The direction R of the spray curtain 5 is largely identical to the direction of the air jet 6, and directed towards the running surface 4.

The spray curtain 5 also extends over the entire width to be coated of the surface 4. The application onto the running surface 4 is also uniform over the entire width, as a result of which the complex overlapping known from the prior art of a plurality of individual nozzles in the width direction is dispensed with.

In contrast to the free-falling curtain of coating medium 14, the spray curtain 5 is not a thin curtain, but rather has seen from the side approximately the form of a spray wedge 5 which has a certain opening angle δ. The central direction R of this spray wedge 5 is referred to as the direction R of the spray curtain 5.

The point on the running surface 4 at which the center of the spray wedge 5 touches the running surface 4 is referred to as the impact point 13 of the spray curtain 5.

The angle α describes the direction of the spray mist at the impact point 13 with the running surface 4, and is referred to as the impact angle α. The impact angle α is a right angle in FIG. 1. The impact angle α is advantageously selected to be significantly smaller, in particular 60° or less.

Figure 2:
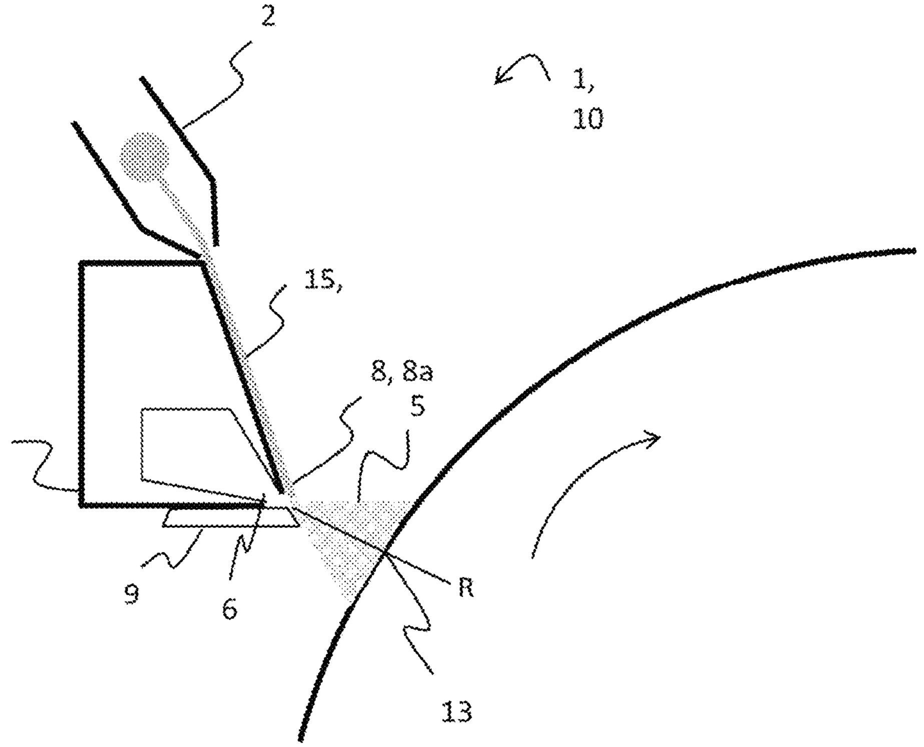
FIG. 2 is an illustration showing the application nozzle according to a further aspect of the invention.

FIG. 2 shows an application nozzle 1 as part of an application unit 10 according to a further aspect of the invention. In the case of the application nozzle 1 shown here, the coating medium is provided from the fluid head 2 not in the form of a curtain, but rather in the form of a supported film 15. Here, a part of the wall of the blow head 3 serves as a support surface for the film. The blow head 3 or the corresponding wall are arranged so that the film 15 flows downward along the wall under the influence of gravity. The supporting wall can, as shown in FIG. 2, be straight or also curved. Through the principle of the supported film 15, the adhesion force of the coating medium on a flat or curved support surface is used to avoid the shrinkage of the liquid film 15 premetered on this support surface. The impact line 8 at which the jet of gaseous medium 6 from the blow head 3 strikes the film 15 of coating medium is located in this embodiment at a lower end of the breaking edge *8a* which forms the support surface or at a distance of less than 5 mm from this breaking edge *8a*.

In order to avoid any potential formation of droplets at this breaking edge *8a* as a result of effects of surface tension, it can be provided that, instead of a straight breaking edge *8a* of the supported liquid film, an undulating or saw tooth-shaped breaking edge *8a* is used at the lower edge of the support surface, as a result of which the effective length of the breaking edge is lengthened.

As a result of an undulating or saw tooth-shaped geometry, the wetting angle of the coating medium with respect to the breaking edge *8a* can be optimally used so that the surface tension of the coating medium itself ensures improved wetting, optimal contact and homogeneous distribution of the liquid over this edge *8a*. As a result of this, in many cases an otherwise necessary chemical solution with the use of expensive tensides can be avoided or circumvented.

Figure 2A:
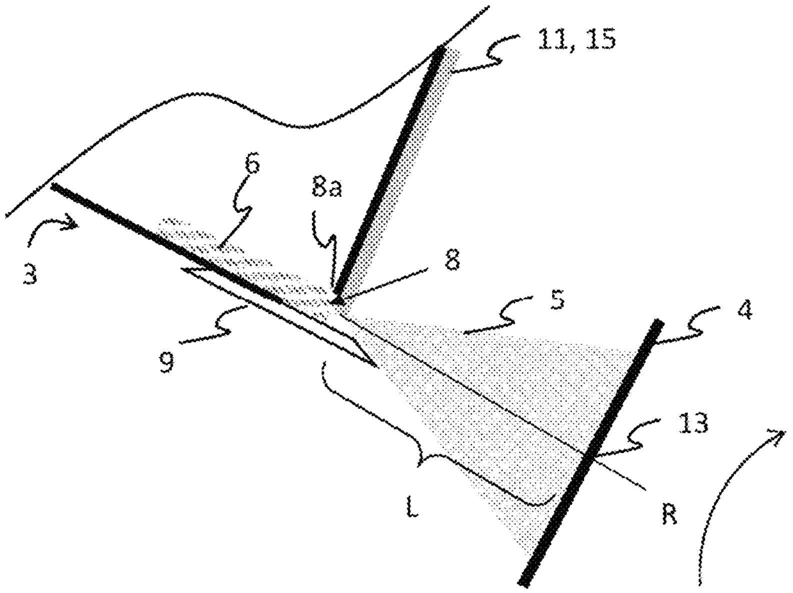
FIG. 2A is an illustration showing a cut-out of the application nozzle according to a further aspect of the invention.

The details around the breaking edge *8a* are once again shown in an enlarged form in FIG. 2A.

The jet 6, for example, an air jet 6 here strikes the film of coating medium 15 at the impact line 8, as a result of which a spray curtain 5 of coating medium forms. This spray curtain 5 is wedge-shaped as viewed from the side.

In the case of this spray curtain 5, a small opening angle δ is often desired, for example, to reduce the formation of a secondary mist.

A small opening angle δ enables a more compact spray curtain which is easier to handle and which in particular can also be arranged more easily at a flat impact angle α to the running surface 4.

In order to adjust the opening angle δ, it is provided in the embodiments according to FIG. 2 and FIG. 2A that the blow head 3 has, at the outlet, a lip 9, preferably an adjustable lip 9.

The length L of the spray curtain 5 can, according to aspects of the present invention, be selected to be very short, and be in particular 30 mm, 20 mm and less.

Figure 3:
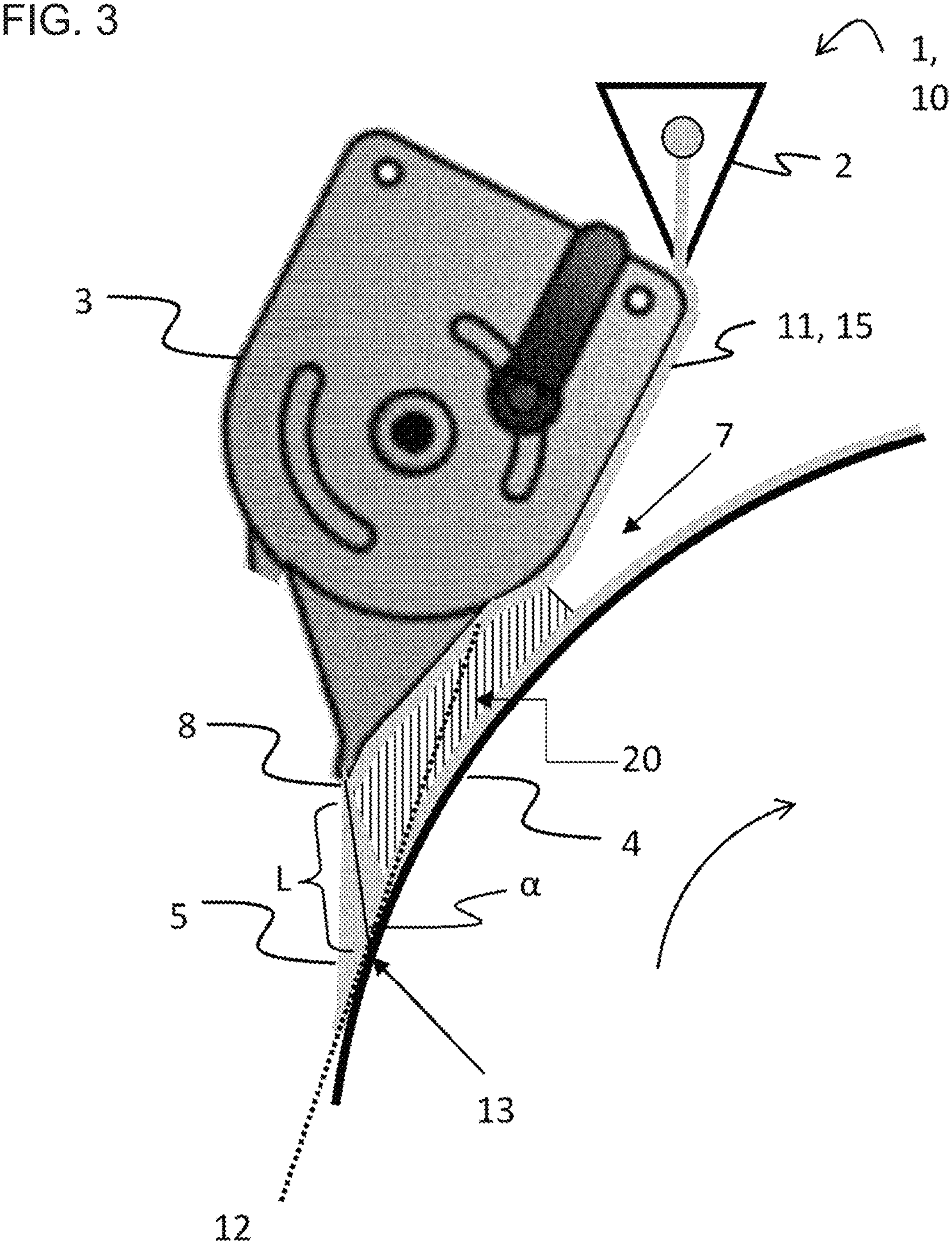
FIG. 3 schematically shows the application nozzle according to a further aspect of the invention as well as an application space according to a further inventive idea.

FIG. 3 shows a further embodiment according to aspects of the invention as well as the further inventive idea. In a similar manner to FIG. 2, the coating medium is discharged from the fluid head 2 onto the wall 11 of the blow head 3 which serves as a support surface for the film of coating medium 15. The film 15 again runs downward on the wall 11 of the blow head 3. FIG. 3 shows that this wall 11 which serves as a support surface can also be embodied in a curved manner. The impact line 8 is again provided at the separation edge *8a* at the lower end of the wall 11. The spray curtain 5 generated is directed in the direction of the moved surface 4 which is embodied in FIG. 3 by way of example as a transfer roll, for example, in a film application unit.

In the embodiment shown here, the direction R of the spray curtain 5 advantageously has a component which is directed counter to the direction of movement of the running surface 4. The impact angle α at which the spray curtain 5 meets the running surface 4 at the impact point 13 is selected here as a flat angle α of less than 60°, in particular between 10° and 50°.

The feature of a spray application in the opposite direction to the direction of movement of the surface 4 together with a central impact angle α which is as flat as possible in the range from 10 to max. 60 degrees facilitates the uniformity of the film of coating medium applied on the moved surface 4. The resultant reversal in direction of the spray curtain 5 after contact with the running surface 4 results in a film homogenization and improved film adherence on the running surface 4.

The application unit 10 in FIG. 3 contains an application space 20. This application space 20 is formed and delimited by:

- the running surface 4,
- the wall of the blow head 11,
- the spray curtain 5,
- the point of the narrowest gap 7 between the running surface 4 and the blow head 3.

In this case, the entire wall 11 of the blow head 3 inside the application space 20 is covered with flowing coating medium. The moved surface 4 inside the application space 20 is likewise covered with coating medium. The latter is very advantageous, but not absolutely essential in the sense of the further inventive idea.

The length L of the spray curtain 5 can once again be selected to be very small, for example, 30 mm, 20 mm or less, in particular 10 mm.

Should a secondary mist now arise inside the application space 20, it can thus be deposited on one of the delimitations of the application space 20 covered with flowing or moved coating medium or leave it through the gap 7.

In order to prevent the secondary mist from escaping from the gap, the gap 7 should tend to be selected to be small, 20 mm should not be exceeded here. Since, however, during operation, both the wall 11 and the running surface 4 are coated with a film composed of coating medium 15, the gap 7 should also be selected to be not too narrow, and avoid contact. A gap height of 2 mm should therefore not be exceeded in the normal case.

It is advantageous in this case if the blow head 3, as shown in FIG. 3, is embodied to be movable, in particular rotatable. As a result of this, not only the angle of impact α, but also the height of the gap 7 can be regulated.

Additionally, yet further means can also be provided to seal off the gap 7. It is thus possible, for example, that a nozzle, not shown explicitly in FIG. 3, for generating an air flow is provided, wherein the air flow is directed or can be directed from outside the application space 20 to the narrowest gap 7. An escape of secondary mist from the application space 20 can additionally be prevented by the counterpressure which can be generated in this manner.

Contact of the secondary mist with the spray curtain 5 is also not critical since the coating medium of the secondary mist is then easily transported with the spray curtain 5 to the moved surface 4.

If the medium is deposited on the running surface 40, this is thus not critical since it is in any event covered with coating medium—or in the case of an opposite direction of movement is immediately covered with coating medium by the spray curtain 5, and no disruptions also occur in the deposited film as a result of the depositing of the secondary mist.

A depositing of coating medium on the wall 11 of the blow head 3, which in this case represents the upper delimitation of the application space 20, is also not critical since this wall 11 is rinsed continuously by the film 15 of coating medium. The coating medium simultaneously serves here as rinsing medium. Any deposits of the secondary mist are then carried along by the rinsing medium composed of the same substance, and subsequently applied as spray mist 5 again onto the running surface 4.

The application space 20 in FIG. 3 is realized, e.g. by the arrangement and orientation of the blow head 3 or the form of the wall 11, so that the tangent 12 of the running surface 4 of the transfer roll at the point of impact 13 of the spray curtain 5 intersects with the wall 11 of the blow head inside the application space 20.

Figure 4:
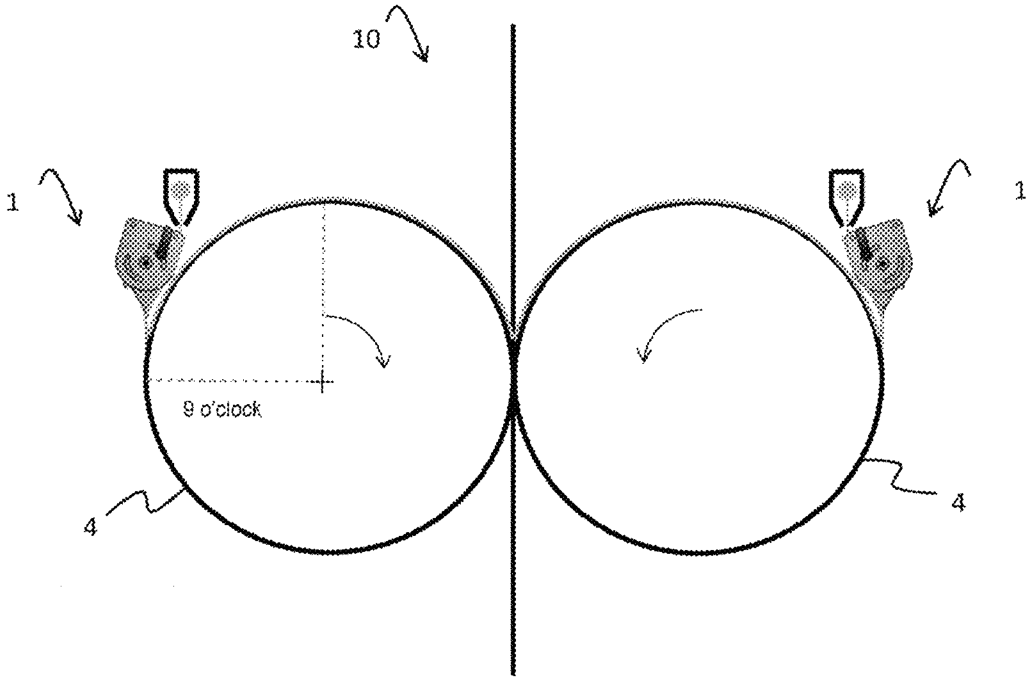
FIG. 4 is an illustration showing an application unit according to one aspect of the invention.

FIG. 4 shows an application unit 10 according to one aspect of the invention. The application unit 10 contains two transfer rolls, on the surface of which in each case one coating medium is discharged. The coating medium is then transferred to a fibrous web in a transfer nip.

At least one application nozzle 1 is provided at each of the transfer rolls. At least one, in particular both application nozzles 1 can in this case be application nozzles according to one aspect of the invention. Alternatively or additionally, at least one, in particular both application nozzles 1 can have an application space 20 according to one aspect of the further inventive idea.

In FIG. 4, the application nozzles 1 are arranged so that the impact point 13 of the coating medium, in particular the impact point of the spray curtain 5 in the case of an application nozzle according to a first aspect of the invention, is located at the 9 o'clock position of the transfer roll.

In this case, one or two transfer rolls with very hard roll covers (0 to 5 P&J, or above 60 ShD) can be provided. During operation of the application unit 10, higher nip loads (80 to 180 kN/m) can be used.

One of the two transfer rolls can be embodied as a controlled deflection roll. This is very important precisely in the case of pairs of hard transfer rolls to ensure a uniform profile over the entire width of the application unit 10 even if a plurality of different operating states should be realized.

The following is a summary list of reference numerals and the corresponding structure used in the above description of the invention:

1 Application nozzle
2 Fluid head
3 Blow head
4 Running surface
5 Spray curtain
6 Jet composed of gaseous medium, air jet
7 Gap
8 Impact line
**8*a*** Breaking edge
9 Lip
10 Application unit
11 Wall with coating medium as rinsing medium
12 Tangent
13 Point of impact of the spray curtain
14 Curtain composed of coating medium
15 Film composed of coating medium
20 Application space
R Direction of the spray curtain
L Length spray curtain
α Angle of impact
δ Opening angle

The invention claimed is:

1. An application nozzle for an application of a coating medium being a liquid coating medium or a pasty coating medium onto a running surface, the application nozzle comprising:

a fluid head formed to generate a fluid film composed of the coating medium or a curtain composed of the coating medium;

a blow head formed to generate a linear jet of a gaseous medium, wherein an impact line is formed where the linear jet of the gaseous medium impacts the fluid film or the curtain composed of the coating medium, thereby forming a spray curtain, said blow head is disposed so that the spray curtain is directed in a direction of the running surface, wherein said blow head further has a wall; and a support surface disposed so that the coating medium is discharged from said fluid head onto said support surface, and is guided as the fluid film along said support surface, wherein said support surface is provided at least partially by said wall of said blow head, wherein said support surface has a lower end forming a breaking edge, and the impact line is provided at said breaking edge or at a distance of less than 5 mm from said breaking edge.

2. The application nozzle according to claim 1, wherein said breaking edge is provided with a structure.

3. The application nozzle according to claim 1, wherein said support surface is provided entirely by said wall of said blow head.

4. The application nozzle according to claim 1, wherein a length of the spray curtain from the impact line to the running surface is at most 50 mm.

5. The application nozzle according to claim 1, wherein the direction of the spray curtain has a component which is directed counter to a direction of movement of the running surface.

6. The application nozzle according to claim 1, wherein the spray curtain has an opening angle δ being less than 30°.

7. The application nozzle according to claim 6, wherein said blow head has an outlet with a lip being suitable for influencing the direction and/or the opening angle of the spray curtain.

8. The application nozzle according to claim 1, wherein the running surface is a running surface in a machine for producing or processing a fibrous web.

9. The application nozzle according to claim 2, wherein said structure of said breaking edge is an undulating structure or a saw tooth structure.

10. The application nozzle according to claim 1, wherein a length of the spray curtain from the impact line to the running surface is at most 20 mm.

11. An application unit for an application of a coating medium being a liquid coating medium or a pasty coating medium onto a running surface, the application unit comprising:

a rotatable transfer roller having a surface functioning as the running surface;

at least one application nozzle, containing:

a fluid head formed to generate a fluid film composed of the coating medium or a curtain composed of the coating medium; and a blow head formed to generate a linear jet of a gaseous medium, wherein an impact line is formed where the linear jet of the gaseous medium impacts the fluid film or the curtain composed of the coating medium, thereby forming a spray curtain, said blow head is disposed so that the spray curtain is directed in a direction of the running surface.

12. The application unit according to claim 11, wherein the application unit defines an application space which is formed and delimited by:

the running surface;

a wall of said blow head;

the spray curtain; and a point of a narrowest gap between the running surface and said blow head, and wherein the coating medium from said fluid head is applied onto said wall of said blow head such that an entirety of said wall of said blow head inside said application space is covered with the coating medium.

13. The application unit according to claim 12, wherein said narrowest gap between the running surface and said blow head is between 2 mm and 20 mm wide.

14. The application unit according to claim 12, further comprising a nozzle for generating an air flow, wherein the air flow is directed from outside said application space to said narrowest gap.

15. The application apparatus according to claim 12, wherein said application space is shaped so that a tangent of the transfer roller intersects with said wall of said blow head inside said application space at a point of impact of the spray curtain.

16. A method for applying a coating medium onto a running surface, which comprises the steps of:

providing the application unit according to claim 11; and applying the coating medium to the running surface by means of the application unit.

17. The method according to claim 16, wherein the linear jet of the gaseous medium at an output of the blow head has a speed of more than 5 m/s.

* * * * *